United States Patent
Takahashi et al.

(10) Patent No.: US 8,000,047 B2
(45) Date of Patent: Aug. 16, 2011

(54) INSPECTION APPARATUS AND INSPECTION METHOD OF MAGNETIC DISK OR MAGNETIC HEAD

(75) Inventors: Masayoshi Takahashi, Yokohama (JP); Masami Makuuchi, Yokohama (JP); Shinji Homma, Nakai (JP); Yoshihiro Sakurai, Hadano (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 12/503,901

(22) Filed: Jul. 16, 2009

(65) Prior Publication Data
US 2010/0033862 A1 Feb. 11, 2010

(30) Foreign Application Priority Data
Aug. 7, 2008 (JP) .................. 2008-204404

(51) Int. Cl.
G11B 5/09 (2006.01)
G11B 20/10 (2006.01)
G11B 21/02 (2006.01)

(52) U.S. Cl. ............................................ 360/39; 360/75
(58) Field of Classification Search ......................... None
See application file for complete search history.

(56) References Cited

U.S. PATENT DOCUMENTS
6,700,369 B1 * 3/2004 Makuuchi et al. ............ 324/212
6,754,025 B1 * 6/2004 Shepherd et al. .......... 360/73.03

FOREIGN PATENT DOCUMENTS
JP 07-141807 6/1995
JP 2007-242152 9/2007

* cited by examiner

*Primary Examiner* — Daniell L Negrón
(74) *Attorney, Agent, or Firm* — Antonelli, Terry, Stout & Kraus, LLP.

(57) ABSTRACT

The present invention provides a technique for converting burst data to digital data, applying FFT operation to $2^n$ (n is an integer) pieces of digital data in response to any start signal synchronized with a sector signal, applying a window function centered around data corresponding to a frequency of a burst data signal component before the FFT operation, and performing head positioning based on a result as the detected value of the burst data.

12 Claims, 4 Drawing Sheets

INSPECTION APPARATUS AND INSPECTION METHOD OF MAGNETIC DISK OR MAGNETIC HEAD

BACKGROUND OF THE INVENTION

The present invention relates to a magnetic head or magnetic disk testing apparatus(an Inspection Apparatus and inspection method of magnetic disk or magnetic head). More particularly, the present invention relates to a technique for accurately detecting the amplitude of servo (hereinafter referred to as burst data) signals to provide accurate positioning of a magnetic head.

A magnetic head or magnetic disk testing apparatus is configured to determine the quality or other aspects of a magnetic head or a magnetic disk, by locating the magnetic head above the magnetic disk, writing and reading test data through the magnetic head on a target track, and measuring the characteristics of a signal read from the target track. Heretofore, servo control has been performed for accurately positioning the magnetic head on a target track of the magnetic disk.

To achieve the above, several techniques have been proposed, such as those described in JP-A No. 141807/1995 and JP-A No. 242152/2007. The technique of JP-A No. 141807/1995 is configured to transmit an amplitude detection signal of burst data through a band-pass filter, an analog to digital conversion circuit, and a digital filter. The technique of JP-A No. 242152/2007 is configured to apply Fast Fourier Transform (FFT) to burst data with a plurality of different frequency components, for detecting the amplitude ratio of each frequency component.

SUMMARY OF THE INVENTION

The accuracy of head positioning can be improved by increasing the S/N of the amplitude detection signal of burst data. Up to now, the S/N has been improved by using a digital filter after analog to digital conversion as described in JP-A No. 141807/1995. In this case, it is necessary to reduce the bandwidth of the digital filter. However, when the bandwidth of the digital filter is reduced, the data processing time until detection increases and the response of servo control is degraded. As a result, it has been difficult to achieve accurate head positioning.

While when an FFT operation is simply applied to the amplitude detection signal as described in JP-A No. 242152/2007, another problem arises. That is, when the test is conducted on a disk in which burst data such as discrete track media (DTM) is written in advance, in which the frequency of the burst data is not synchronized with the sampling frequency of an analog to digital converter (ADC), a leak of frequency spectrum occurs after the FFT operation. As a result, the signal amplitude detection accuracy of the burst data is seriously degraded.

Further, the FFT operation requires parallel control of a plurality of ADCs at high speed in order to improve the frequency resolution of the FFT. However, when a plurality of ADCs are controlled in parallel, conversion timing difference (clock skew) occurs in each ADC, leading to degradation of the signal amplitude detection accuracy of the burst data.

Thus, the present invention provides a magnetic head or magnetic disk testing apparatus and method capable of improving the S/N of the amplitude detection signal of burst data to achieve accurate head positioning.

Further, the present invention provides a magnetic head or magnetic disk testing apparatus and method capable of improving the detection accuracy in FFT operation and DFT (Discrete Fourier Transform) operation when the frequency of the burst data is not synchronized with the sampling frequency of the ADC.

Still further, the present invention provides a magnetic head or magnetic disk testing apparatus and method capable of reducing, when a plurality of ADCs are controlled in parallel, the clock skew (phase shift) of each ADC and improving the detection accuracy in FFT operation.

In a first feature of the present invention, there is provided a magnetic head or magnetic disk testing apparatus and method, including: writing a servo signal having at least two or more phases, to each sector of a magnetic recording medium through a magnetic head; reading the written servo signal from the magnetic recording medium through the magnetic head; measuring characteristics of the magnetic head or magnetic disk; and detecting and positioning a position of the magnetic head on the magnetic disk based on the read data. The detecting and positioning of the magnetic head position is performed by quantizing the servo signal, and then applying harmonic analysis to the quantized data.

In a second feature of the present invention, in addition to the first feature, the quantized servo signal has n (n is a power of 2) pieces of data, and the harmonic analysis is started based on an operation start signal generated from a timing signal according to a sector signal.

In a third feature of the present invention, in addition to the second feature, the quantization is performed based on the timing signal. The detecting and positioning of the magnetic head position is performed by applying a window function to the quantized data, and then applying FFT or DFT operation to the windowed data.

In a fourth feature of the present invention, in addition to the first feature, the detecting and positioning of the magnetic head position is performed by the servo signal quantized by N (n is two or more) ADCs, by applying a reference signal having a given frequency $f_r$ to the N ADCs, detecting the phase shifts between the N ADCs, and setting conversion timings of the N ADCs based on the phase shifts.

These and other objects, features and advantages of the invention will be apparent from the following more particular description of preferred embodiments of the invention, as illustrated in the companying drawings.

DESCRIPTION OF THE PREFERRED EMBODIMENTS

Figure 1:
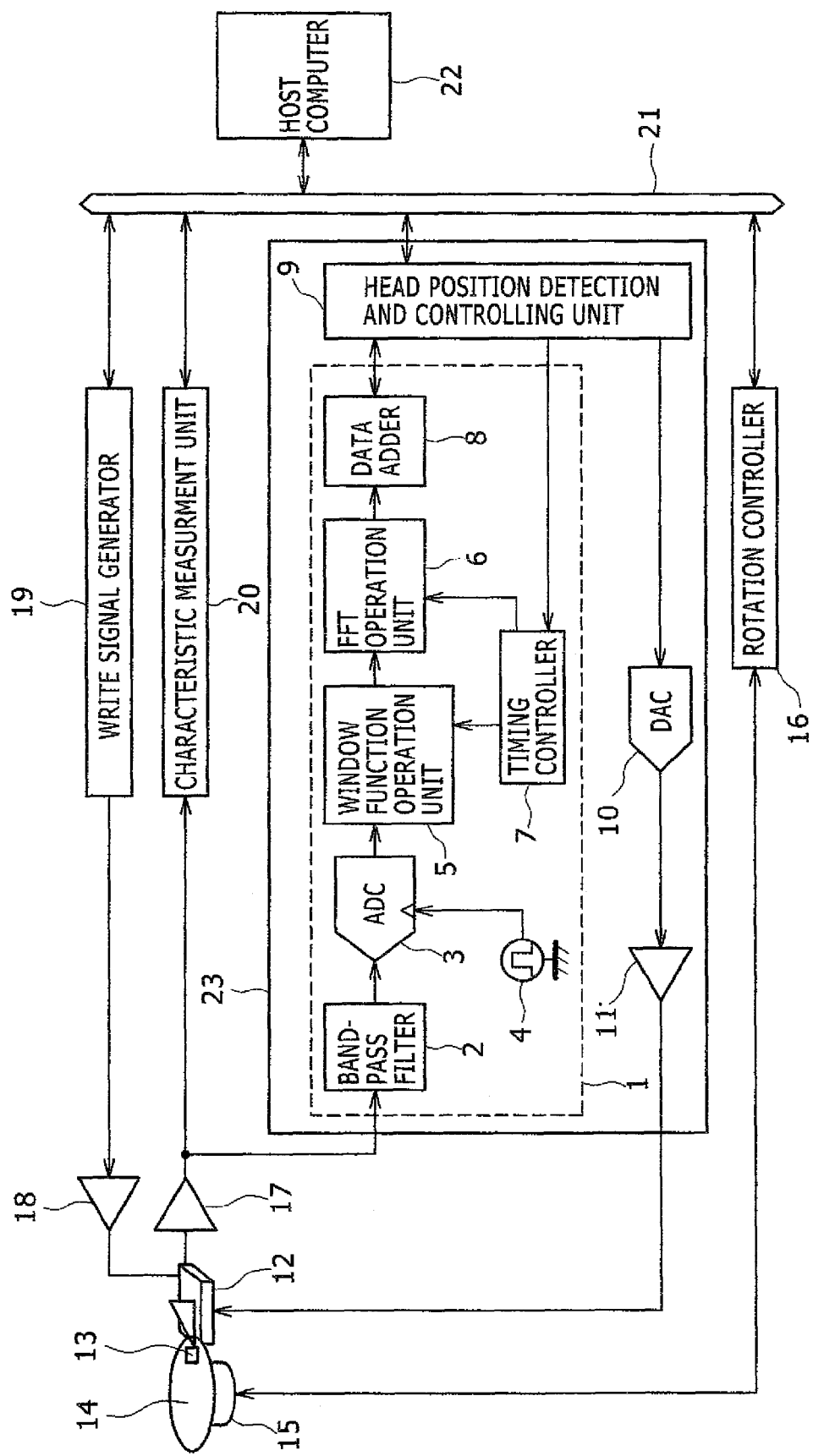
FIG. 1 is a schematic view showing a first embodiment of the present invention.

Hereinafter preferred embodiments of the present invention will be described with reference to the accompanying drawings. FIG. 1 is a system block diagram of a magnetic head testing apparatus or magnetic disk testing apparatus according to an embodiment of the present invention. In the testing apparatus, a disk rotation unit 15 holds and rotates a magnetic disk 14, while locating a magnetic head 13 above the magnetic disk 14. A write signal generator 19 outputs a signal to generate test data. The generated test data is recorded on a target track in the magnetic disk 14 through a write amplifier 18. Next, the recorded test data is read by the magnetic head 13, amplified by a read amplifier 17, and is input as a reproduced signal to a characteristic measurement unit 20 and to a servo controller 23. The characteristic measurement unit 20 measures the electrical characteristics such as the S/N of the reproduced signal. Then, the characteristic measurement unit 20 outputs the measurement result to a host computer 22 of the testing apparatus through a tester bus 21. The host computer 22 performs quality determination and classification of the magnetic head or magnetic disk to be tested, based on the output data.

Figure 2A:
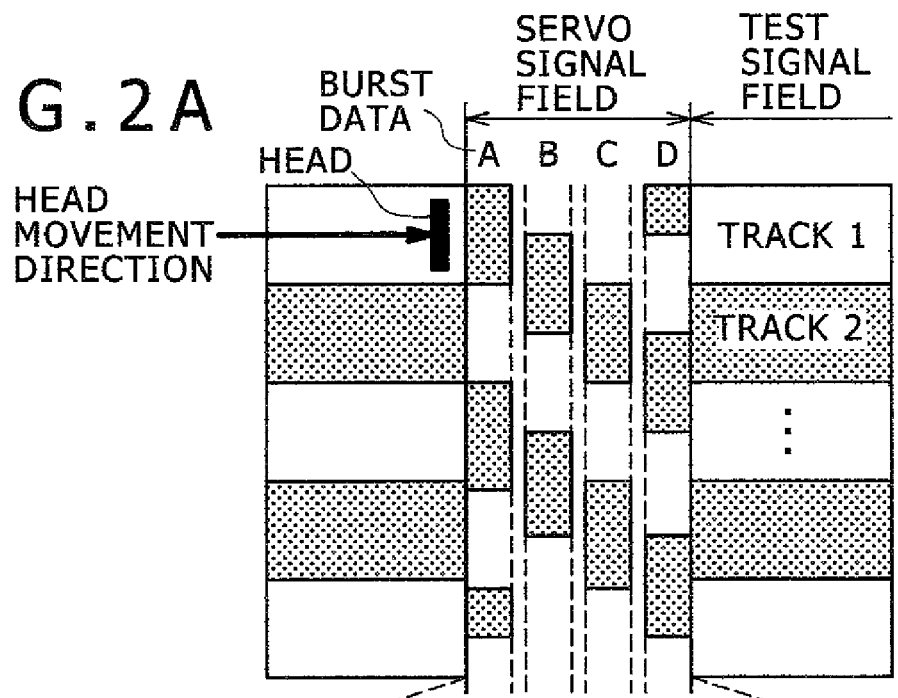
FIGS. 2A and 2B show an example of output data of an FFT operation unit.
Figure 2B:
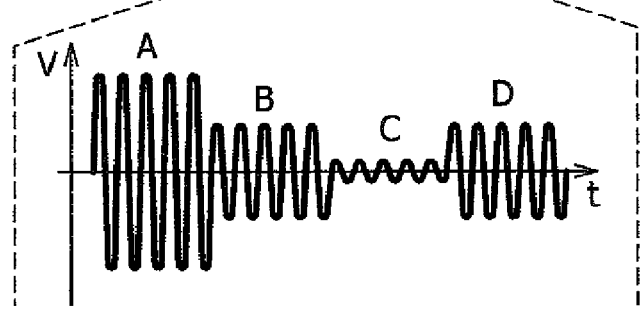

Here, for example, as shown in FIG. 2A, a burst data signal, which is a servo signal, is written in each sector on the magnetic disk 14 in advance before the start of the test, in order to provide servo control to position the magnetic head 13 on the target track. Here, the amplitude values of burst data pieces A to D are different depending on the position of the magnetic head 13 with respect to the burst data. For example, as shown in FIG. 2B, when the magnetic head 13 passes through the center of the burst data A, the amplitude of A represents the maximum value, while the amplitudes of B and D represent an almost intermediate value, and the amplitude of C represents the minimum value. The servo controller 23 provides position control to position the magnetic head 13 at the center of the target track or at an arbitrary position thereof, based on the amplitude values of the burst data pieces A to D. More specifically, the burst data pieces A to D are first input to a servo signal detection unit 1 in the servo controller 23. The band-pass filter 2 filters out the frequency components (noise) except the signal component $f_{in}$ of the burst data, and outputs the signal to the ADC 3. The ADC 3 converts the input signal to digital data at the timing of frequency $f_s$ of a clock signal source 4. Then, the ADC 3 outputs the digital signal to a window function operation unit 5.

The window function operation unit 5 multiplies n (n is a power of 2) pieces of digital data D(n) for each phase by predetermined window function data W(n), in response to a start signal output from the timing controller 7 for each phase of the burst data pieces A to D, based on a sector signal which is a reference signal within the magnetic head or magnetic disk testing apparatus. The multiplied data D'(n) is expressed by equation (1).

$$D'(n)=D(n)\times W(n) \tag{1}$$

Here, the window function processing is necessary when the signal frequency of the reproduced burst data and the clock signal source 4 (sampling frequency) are not synchronized with each other. However, this is not the case when the signal frequency of the reproduced burst data and the clock signal source 4 are coherent.

The characteristics of the used window function are determined depending on the signal detection accuracy to be targeted. More specifically, it should be determined based on the S/N ratio associated with the signal component which is the sum of the signals in the main lobe of the window function, or based on the frequency resolution necessary to discriminate a plurality of different frequency components. For example, the S/N ratio can be improved by Blackman-Harris window function or other similar functions.

An FFT operation unit 6 performs an FFT operation using n pieces of output data D'(n) of the window function operation unit 5, in response to a start signal output from the timing controller 7 for each phase of the burst data pieces A to D.

Then, the FFT operation unit 6 outputs data F(n) after the FFT operation, to a data adder 8. Here, m denotes the frequency of the signal component $f_{in}$ of the burst data, which can be expressed as equation (2) using the sampling clock frequency $f_s$ and the digital data number n used in the FFT operation.

$$m=(n\times f_{in})/f_s \tag{2}$$

Figure 3:
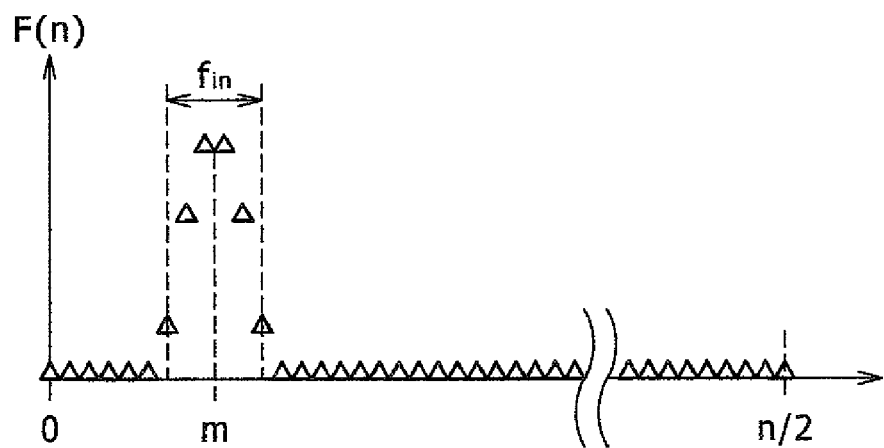
FIG. 3 shows an example of a sector servo signal.

Here, m is a positive value but not limited to an integer. FIG. 3 shows an example of F(n). The window function is used to increase the width of the signal component $f_{in}$ in the range indicating the main lobe of the used window function. FIG. 3 shows an example in which the width of the signal component is increased in the data range of m±3 by the window function. For example, when m=8.5, it is increased to F(6), F(7), F(8), F(9), F(10), and F(11). The original amplitude value of $f_{in}$ is equal to the value obtained by squaring and adding the signal data within the main lobe. The data adder 8 calculates the signal range given by equation (2) from the values of $f_{in}$, $f_s$, and n. Then, the data adder 8 squares the signals within the specified range and adds the squared values, and outputs the result to a head position detection and control unit 9. Here, when the window function processing is not performed, the data indicating the signal component is used as detected amplitude data, instead of adding squared neighborhood data as in the case of the window function processing.

The head position detection and control unit 9 collects the amplitude data of the phases of the burst data pieces A to D, and detects the position of the magnetic head 13 based on the collected data. Then, the head position detection and control unit 9 outputs a position signal for correcting the displacement of the magnetic head 13 from the target position, to a stage 12 through a digital to analog converter (DAC) 10 and through an output amplitude 11. This operation is repeated for each sector to be able to provide accurate positioning of the magnetic head 13.

Here, in the output data of the FFT operation unit 6, the frequency resolution Δf of each data piece is denoted by $f_s/n$, and the data range indicated by dotted lines is denoted by k, which is centered around m shown in FIG. 3. The signal bandwidth $f_{BW}$ of the data adder can be given by equation (3).

$$f_{BW}=k\Delta f=kf_s/n \tag{3}$$

For example, when $f_s$=200 MHz with n=256 and k=6, it is possible to detect with $f_{BW}$≈4.7 MHz. Here, k is the number of data pieces within the main lobe of the window function. The value of k varies depending on the used window function. When the window function processing is not performed, the value of k is equal to 1.

In this way, it is possible to easily extract the signal component of narrow bandwidth by adjusting the values of $f_s$, n, and k, independent of the frequency components of the burst data. As a result, the amplitude detection S/N of the burst data is improved, thereby enabling accurate positioning of the magnetic head.

Next, a second embodiment of the present invention will be described with reference to FIG. 4. In the system of the first embodiment, the signal detection S/N of the burst data frequency $f_{in}$ can be improved by speeding up the ADC sampling rate, and thereby reducing the bandwidth of the signal component to be extracted. An example of means for achieving fast sampling rate is parallel control of ADCs. However, the parallel control of ADCs has a problem in that the signal amplitude detection accuracy is degraded due to sampling clock skew. For this reason, this embodiment describes a calibration method of the sampling clock skew for achieving a fast and accurate ADC unit.

Figure 4:
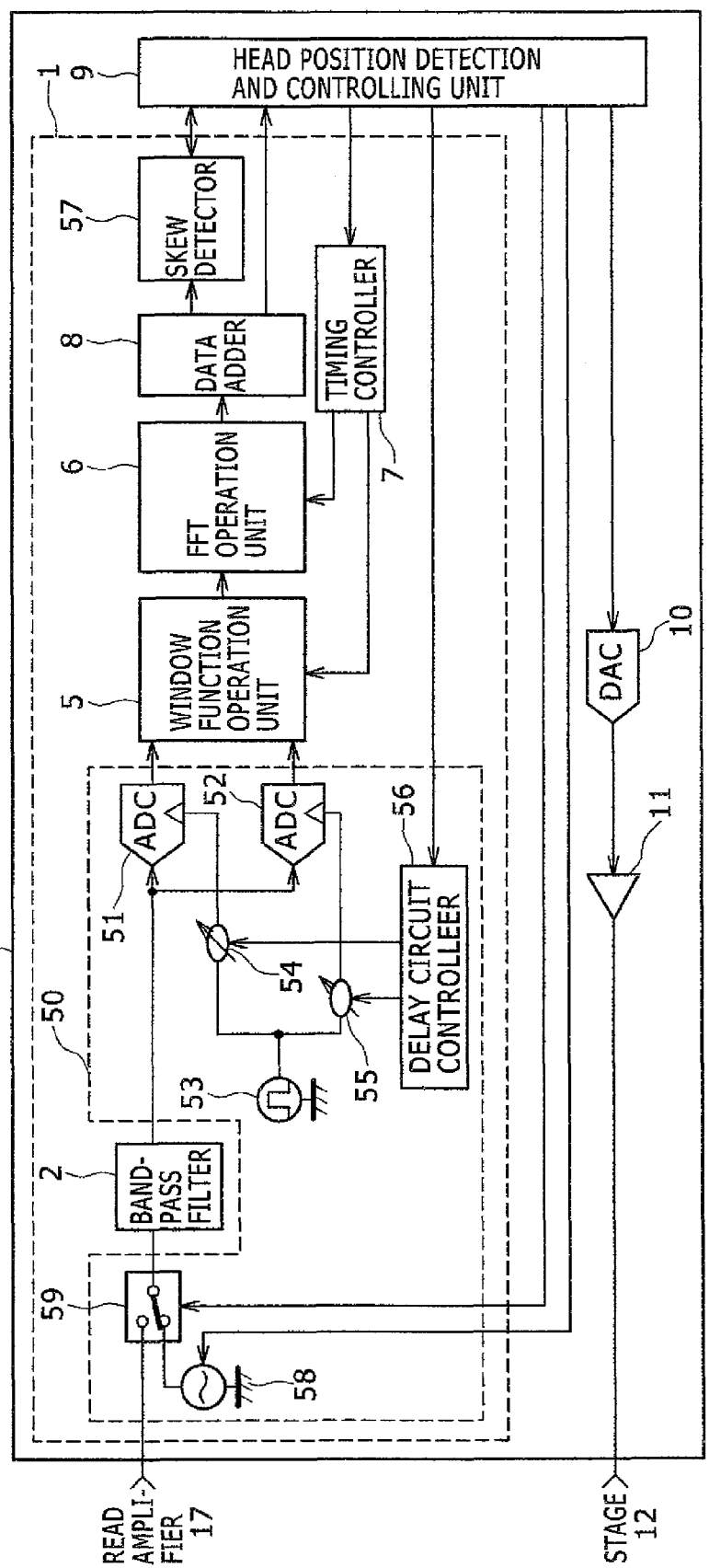
FIG. 4 is a schematic view showing a second embodiment of the present invention.

In FIG. 4, a servo signal detection unit 1 includes a band-pass filter 2, an ADC parallel controller 50, a window function operation unit 5, an FFT operation unit 6, a data adder 8, a timing controller 7, and a skew detector 57.

In the ADC parallel controller 50, the output of the band-pass filter 2 is distributed to both ADCs 51 and 52. The ADCs 51 and 52 receive the output clocks of the clock generator 53, respectively, through variable delay circuits 54 and 55. Then, the ADCs 51 and 52 convert the output signal of the band-pass filter 2 into digital data at timings of the received clocks. Here, the variable delay circuits 54 and 55 can provide variable control of the input/output delay time of the circuits, in response to control signals from a delay circuit controller 56. The output clocks are phase shifted with respect to each other by 180 degrees, namely, the delay time is shifted by ½ $f_s$. In this way, the sampling clock of the ADC parallel controller can be speeded up twice faster than the sampling clock of the ADCs 51 and 52. However, sampling clock skew (phase shift) occurs in the ADCs 51 and 52, due to the delay time difference between the variable delay circuits 54 and 55, and due to the aperture difference between the ADCs 51 and 52. Upon occurrence of the sampling clock skew, the ADCs 51 and 52 operate to perform frequency demodulation at $f_s/2$ with respect to the input frequency $f_{in}$. As a result, the detection accuracy of $f_{in}$ is degraded.

Figure 5:
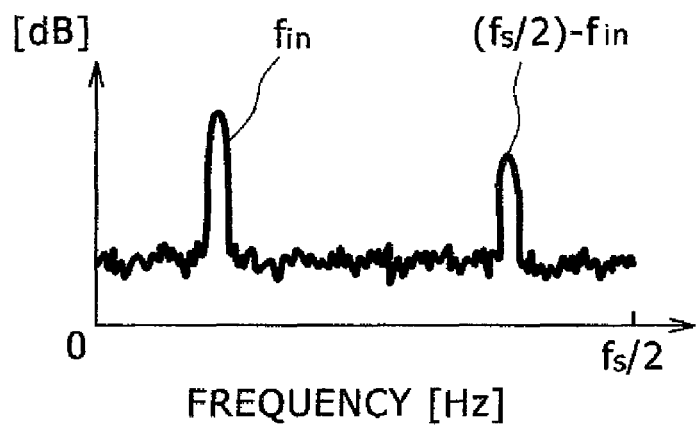
FIG. 5 shows a first example of an operation waveform according to the second embodiment.

FIG. 5 shows the FFT operation result when clock skew occurs. As shown in the figure, a spurious of $(f_s/2)-f_{in}$ occurs when the frequency $f_{in}$ is input to the ADCs 51 and 52. The power of this spurious is generated by dividing the power of $f_{in}$, so that the detected value of $f_{in}$ decreases.

Thus, the delay control amount of the sampling clock is corrected. A switch 59 operates in correction mode, upon receiving a control signal from the head position detection and control unit 9. More specifically, the switch 59 inputs an output signal of the reference signal source 58 that outputs a given single frequency ($f_t$) within the input frequency range, to the servo signal detection unit 1. Then, the ADC parallel controller 50 performs sampling of the output signal of the band-pass filter 2. Here, in response to the control signal of the head position detection and control unit 9, for example, the delay circuit controller 56 fixes the delay time of the variable delay circuit 54 to an arbitrary value. In this way, the FFT processing is performed by varying the delay time of the variable delay circuit 55.

Next, the head position detection and control unit 9 outputs a gate signal to the timing controller 7 in order to perform the FFT processing. In response to the gate signal acting as a start signal, the output data of the ADC parallel controller 50 is processed by the window function operation unit 5, the FFT operation unit 6, and the data adder 8. Here, the data adder 8 calculates the signal component of $f_t$ and the frequency component of $(f_s/2)-f_t$, and outputs the result to the skew detector 57. The skew detector 57 holds the output of the data adder 8 for each set value of the variable delay circuit 55. This value is as shown in FIG. 6, in which the abscissa represents the delay time of the variable delay circuit 55 while the ordinate represents the power of the signal component of $f_t$ and the frequency component of $(f_s/2)-f_t$.

Figure 6:
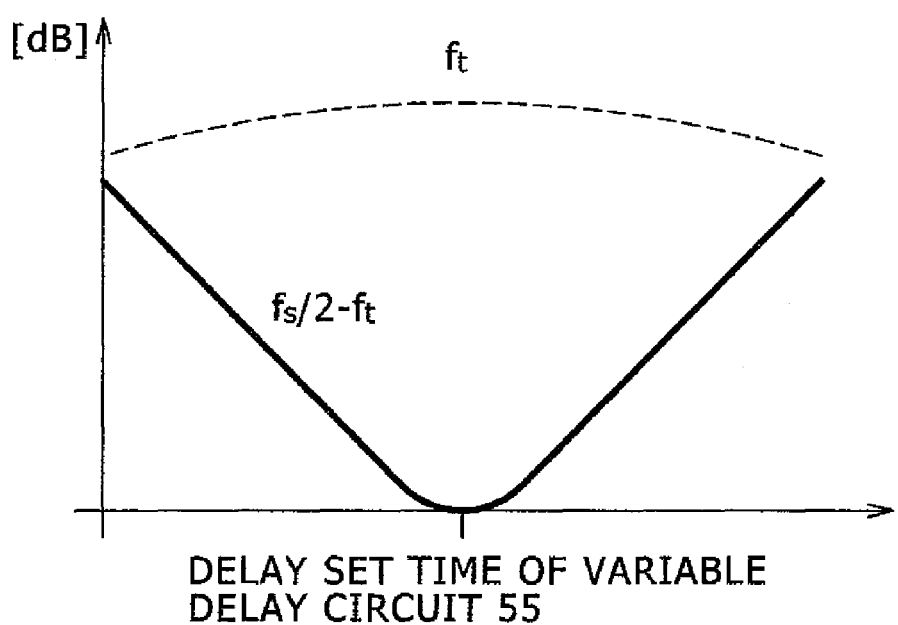
FIG. 6 shows a second example of the operation waveform according to the second embodiment.

In FIG. 6, the optimal value for delay time setting corresponds to a point representing the maximum value with the signal component of $f_t$, or a point representing the minimum value with the frequency component of $(f_s/2)-f_t$. The skew detector 57 observes either one of the signals, $f_t$ or $(f_s/2)-f_t$, and outputs the optimal value of the delay time to the head position detection and control unit 9. Here, as seen from FIG. 6, the power of the spurious component, $(f_s/2)-f_t$, is more sensitive to the delay time set value, so that the optimal value can be easily detected. Upon completion of the data processing in the specified range of the correction set amount, the head position detection and control unit 9 holds the optimal delay time set value received from the skew detector 57, and controls the delay circuit controller so that the delay time setting is fixed to the optimal value. Then, the head position detection and control unit 9 switches the switch 59 to input the burst data from the read amplifier 17, to the servo signal detection unit 1.

Such an operation allows the sampling clock skew to be easily corrected in the ADC parallel control, enabling fast and accurate ADC conversion to increase the amplitude detection S/N of the burst data. As a result, accurate head positioning can be achieved.

Although the above embodiment has been described in which two ADCs are controlled in parallel, it goes to without saying that the sampling clock skew can be corrected in a similar manner, even when the parallel number is three or more (in particular, a power of 2).

As described above, according to the present invention, it is possible to provide a magnetic head testing apparatus and a magnetic disk testing apparatus as well as a method therefor, capable of improving the S/N of the amplitude detection signal of burst data and achieving accurate head positioning.

Further, according to the present invention, it is possible to provide a magnetic head testing apparatus and a magnetic disk testing apparatus as well as a method therefor, capable of improving the detection accuracy in FFT operation even when the burst data frequency and the sampling frequency of the ACD are not synchronized with each other.

Still further, according to the present invention, it is possible to provide a magnetic head testing apparatus and a magnetic disk testing apparatus as well as a method therefor, capable of reducing, when a plurality of ADCs are controlled in parallel, the clock skew (phase shift) of each ADC and improving the detection accuracy by harmonic analysis using FFT, DFT, or other Fourier transform.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A magnetic head or magnetic disk testing apparatus for measuring characteristics of a magnetic head or a magnetic disk, the magnetic head or magnetic disk testing apparatus comprising:

a servo signal detector for reading a servo signal written in each sector of the magnetic disk, through the magnetic head; and a servo controller including a head detection and positioning unit for detecting and positioning a position of the magnetic head on the magnetic disk based on the servo signal detector, wherein the servo signal detector includes an analog to digital conversion unit for quantizing the servo signal, and an analysis unit for performing harmonic analysis of the servo signal quantized by the analog to digital conversion unit, wherein the quantized servo signal has n (n is a power of 2) pieces of data, wherein the analysis unit starts operation based on an operation start signal generated by a timing signal according to a sector signal, wherein the analog to digital conversion unit quantizes the n (n is a power of 2) servo signals based on the timing signal, wherein the servo signal detector further includes a window function operation unit for applying a window function to the quantized servo signal, and wherein the analysis unit applies FFT or DFT operation to the n pieces of windowed data.

2. The magnetic head or magnetic disk testing apparatus according to claim 1, wherein the servo signal detector includes a data adder for squaring and adding arbitrary data from a data line after the FFT or DFT operation.

3. The magnetic head or magnetic disk testing apparatus according to claim 1, wherein the servo controller includes:

N (N is two or more) analog to digital converters; and an analog to digital converter (ADC) parallel controller for applying a reference signal having a given frequency $f_t$ to the N analog to digital converters, detecting phase shifts between the N analog to digital converters, and setting conversion start time of the N analog to digital converters based the phase shifts.

4. The magnetic head or magnetic disk testing apparatus according to claim 3, wherein the ADC parallel controller includes:

a reference signal source set to the given frequency $f_t$;

a switch for switching between a signal to be measured and an output signal of the reference signal, and outputting the selected signal;

N analog to digital converters to which the output signal of the switch is input;

a clock signal source for generating a clock frequency $f_s$ signal for conversion by each of the analog to digital converters;

a transmission time controller for controlling time for which the clock signal is transmitted to each of the analog to digital converters; and a controller for controlling the transmission time of the transmission time controller.

5. The magnetic head or magnetic disk testing apparatus according to claim 4, wherein the controller controls the transmission time based on a process result obtained from a plurality of operation results obtained by the analysis unit by varying the transmission time of the transmission time controller.

6. The magnetic head or magnetic disk testing apparatus according to claim 4, wherein the process result is obtained by detecting an arbitrary data amplitude corresponding to the given frequency component $f_t$ or $(Nf_s/2-f_t)$ (where $f_s$ is the clock frequency), from the plurality of operation results of the analysis unit, and wherein the controller sets a transmission set value of when a detected value represents a maximum or minimum value, to a transmission time set value for a test.

7. The magnetic head or magnetic disk testing apparatus according to claim 3, wherein the N analog to digital converters quantize the n (n is a power of 2) servo signals, respectively, based on the timing signal, wherein the servo signal detector further includes a window function operation unit for applying a window function to the quantized servo signal, and wherein analysis unit applies FFT operation to n pieces of windowed data.

8. A magnetic head or magnetic disk testing method comprising the steps of:

writing a servo signal to each sector of a magnetic disk through a magnetic head:

reading data from the magnetic disk through the magnetic head;

measuring characteristics of the magnetic head or the magnetic disk; and detecting and positioning a position of the magnetic head on the magnetic disk based on the read data, wherein the detecting and positioning step is performed by quantizing the servo signal, then applying FFT or DFT operation to the quantized data, and starting the FFT or DFT operation based on an operation start signal generated by a timing signal according to a sector signal, wherein the quantized servo signal includes n (n is a power of 2) pieces of data wherein the quantization is performed based on the timing signal, and wherein the detecting and positioning step is performed by applying a window function to the quantized data, and then applying the FFT or the DFT operation to the windowed data.

9. The magnetic head or magnetic disk testing method according to claim 8, wherein the detecting and positioning step is performed by the servo signal quantized by the N (N is two or more) analog to digital converters controlled in parallel, wherein the detecting and positioning step further includes the steps of:

applying a reference signal having a given frequency $f_t$ to the N analog to digital converters;

detecting phase shifts between the N analog to digital converters; and setting a conversion timing difference (phase difference) of the N analog to digital converts based on the phase shifts.

10. The magnetic head or magnetic disk testing method according to claim 9, wherein the step of setting the conversion timing difference (phase difference) of the parallel-control analog to digital converters is performed based on a plurality of FFT or DFT operation results obtained by varying the phase shifts between the N analog to digital converters.

11. The magnetic head or magnetic disk testing method according to claim 10, wherein the step of setting the conversion timing difference (phase difference) of the parallel-control analog to digital converters is performed by detecting the data amplitude corresponding to the given frequency component $f_t$ or $(Nf_s/2-f_t)$ (where $f_s$ is the clock frequency) of the plurality of FFT or DFT operation results, and setting a transmission set value of when a detected value representing a maximum or minimum value, to a transmission time set value for a test.

12. The magnetic head or magnetic disk testing method according to claim 9, wherein the quantization is performed based on the timing signal, and wherein the detecting and positioning step is performed by applying a window function to the quantized data, and then applying the FFT or DFT operation to the windowed data.

* * * * *